Feb. 26, 1935.  R. R. LIVINGSTON  1,992,871
CRATE PACKING DEVICE
Filed Sept. 23, 1933
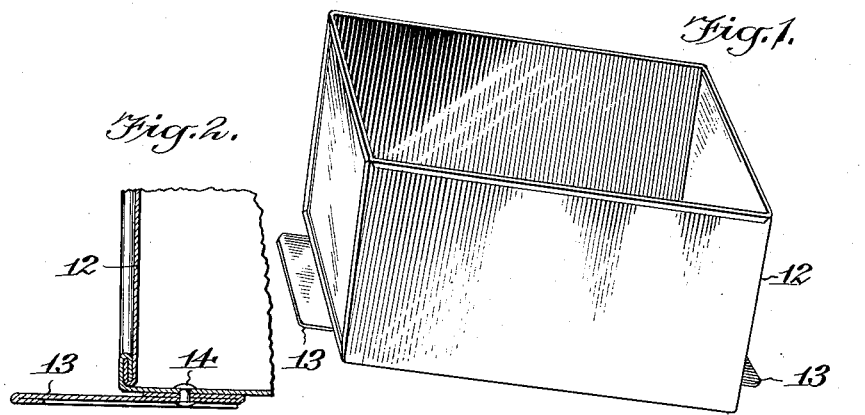
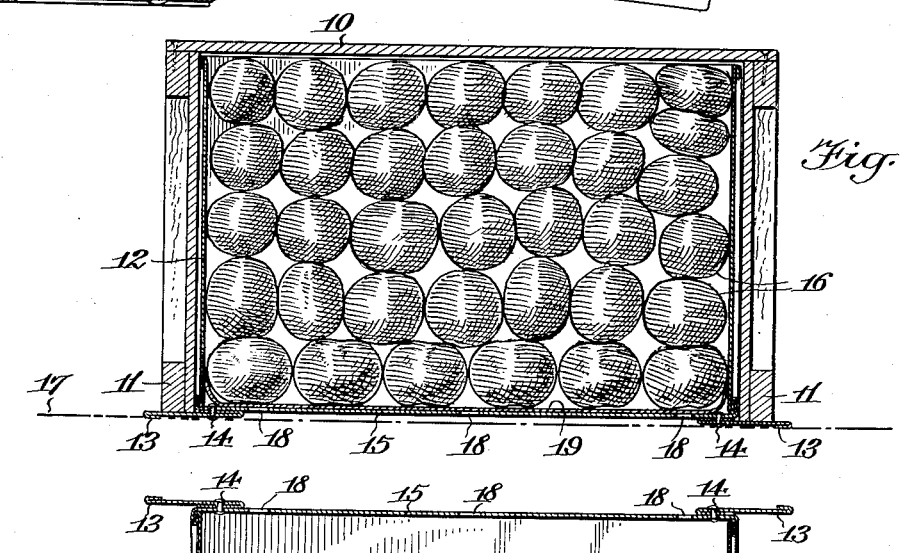
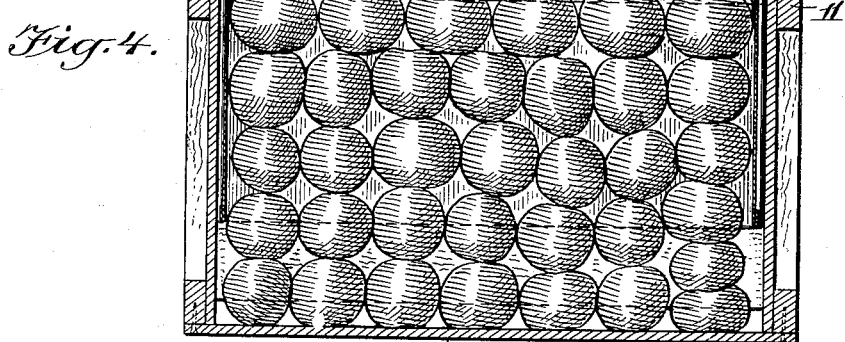
WITNESSES
Geo. W. Naylor
Chris Feinle
INVENTOR
Robert R. Livingston
BY
Munn, Anderson, Stanley, Foster & Liddy
ATTORNEYS Patented Feb. 26, 1935

1,992,871

UNITED STATES PATENT OFFICE 1,992,871

CRATE PACKING DEVICE

Robert R. Livingston, Clermont, N. Y.

Application September 23, 1933, Serial No. 690,732

2 Claims. (Cl. 226—17)

This invention relates to a device for hand packing fruit in boxes or crates.

An object of the invention is to facilitate and expedite the packing or filling of containers, such as boxes or crates, with fruit, such as apples and, at the same time, obtain a neat even "face" of the fruit at the top of the crate or box.

Another object of the invention is the provision of a packing device which enables the application of a cover sheet to the fruit, and to prevent the sheet from being removed with the packer when the latter is withdrawn from the box or crate in the packing operation.

The nature of the invention and its distinguishing features and advantages will appear when the following specification is read in connection with the accompanying drawing, in which Figure 1 is a perspective view of the fruit packing receptacle;

Fig. 2 is an enlarged fragmentary sectional view illustrating one of the hand grips on the receptacle;

Fig. 3 is a sectional view of the packing receptacle filled with fruit and a crate placed over the same upside down prior to the inversion of the receptacle and crate;

Fig. 4 is a view similar to Fig. 3, but showing the receptacle and crate inverted and the receptacle partly withdrawn.

The device of the present invention is used in conjunction with a standard box or crate designated 10. This crate may be of any size and shape and in the present instance the crate is of rectangular construction and has ends including cleats 11 thereon respectively at the top. The device of the present invention consists of a receptacle 12, which will be of the same general shape of the crate 10 and will be slightly smaller in exterior dimensions than the interior dimensions of the crate so that the crate may slide and fit over the receptacle 12. The receptacle 12 is made preferably of sheet metal. The receptacle 12 has extensions 13 secured or riveted, as at 14, to the bottom 15 thereof, and disposed at the opposite ends respectively. These extensions 13 constitute hand grips for purposes to be explained. The bottom 15 of the receptacle 12 is flat throughout.

In packing the crate with fruit, such as apples, designated 16, the receptacle 12 is positioned with its bottom 15 resting on the ground or other suitable support indicated by the dot-and-dash line 17. The receptacle is then filled with apples to the desired fullness. The bottom 15 of the receptacle being flat throughout, will "plate" or evenly "face" the bottom apples. The empty crate 10 is then placed upside down over the filled receptacle 12. The operator using both hands, then grips the extensions 13 and cleats 11 by canting the crate with the receptacle therein and inverts the same, thus transferring the apples 16 from the receptacle 12 into the crate 10. By releasing the cleats 11 and by exerting an upward pulling force on the extensions 13 with the hands, the receptacle 12 may be removed. Thus the apples as packed in the crate 10, will have a neat even "face" at the top of the crate.

In accordance with another feature of the invention, the bottom 15 of the receptacle has a plurality of holes 18 therein. When it is desired to apply a cover sheet to the face apples, the holes 18 serve adequately to allow air to enter the receptacle so that the cover sheet will not be carried away or be removed with the receptacle 12 when the latter is withdrawn from the crate 10. In the drawing, the cover sheet is designated 19. This sheet 19 is laid on the bottom 15 of the receptacle 12 before the fruit or apples are filled or packed in the receptacle 12. By performing the inversion as aforesaid, the cover sheet 19 will be disposed over the apples at the top of the crate 10.

After the crate 10 has been filled or packed with apples in the manner hereinbefore described, it will be closed by nailing a top in place thereon.

In cases of crates or boxes having built in corner posts, the packing receptacle may be recessed at the corners so as to accommodate these posts.

What I claim is:

1. A fruit packing and cover sheet applying device, consisting of a fruit receptacle of rectangular construction having a flat bottom, and also having hand grips projecting therefrom at the bottom thereof, said receptacle having holes therein for admitting air to the interior of the receptacle to prevent withdrawal of the cover sheet with the receptacle in the packing operation.

2. A fruit packing and cover sheet applying device consisting of a fruit receptacle having a bottom substantially flat throughout, hand grips projecting from the receptacle, and said bottom having holes therein for admitting air to the interior of the receptacle to prevent withdrawal of the cover sheet with the receptacle in the packing operation.

ROBERT R. LIVINGSTON.